(12) United States Patent
Ren et al.

(10) Patent No.: US 8,650,979 B2
(45) Date of Patent: Feb. 18, 2014

(54) DRIVE SYSTEM OF AN ELECTRIC VEHICLE

(75) Inventors: Yi Ren, Guangdong (CN); Ruru Niu, Guangdong (CN); Zhengguang Han, Guangdong (CN); Zhouping Tang, Guangdong (CN); Wei Li, Guangdong (CN); Feng Ke, Guangdong (CN); Shenglin Yang, Guangdong (CN); Shibo Dong, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 186 days.

(21) Appl. No.: 13/245,246

(22) Filed: Sep. 26, 2011

(65) Prior Publication Data

US 2012/0073394 A1 Mar. 29, 2012

(30) Foreign Application Priority Data

Sep. 26, 2010 (CN) .......................... 2010 1 0291549
Aug. 5, 2011 (CN) .......................... 2011 1 0225534

(51) Int. Cl.
*F16H 3/08* (2006.01)
(52) U.S. Cl.
USPC .......................................................... 74/325

(58) Field of Classification Search
USPC ............................ 74/325, 330, 331, 333, 340
See application file for complete search history.

(56) References Cited

U.S. PATENT DOCUMENTS

| 4,023,418 | A | * | 5/1977 | Zenker | 74/15.86 |
|---|---|---|---|---|---|
| 4,476,748 | A | * | 10/1984 | Morscheck | 477/122 |
| 4,637,269 | A | * | 1/1987 | Hasegawa et al. | 74/335 |
| 5,429,005 | A | * | 7/1995 | Fukui et al. | 74/325 |

* cited by examiner

*Primary Examiner* — Ha D Ho
(74) *Attorney, Agent, or Firm* — Finnegan, Henderson, Farabow, Garrett & Dunner, LLP

(57) ABSTRACT

A drive system of an electric vehicle includes a drive motor, a transmission and a hydraulic system. The transmission has an input shaft, a countershaft, an output shaft, a first transmission unit placed between the countershaft and the output shaft, a first clutch, a second transmission unit placed between the countershaft and the input shaft, and a second clutch. The drive motor is attached to the input shaft, which is attached to the countershaft to provide power of the drive motor to the countershaft; the first clutch is configured for linking or cutting off the power transmission between the countershaft and the first transmission unit; and the second clutch is configured for linking or cutting off the power transmission between the countershaft and the second transmission unit. The first transmission unit has a first transmission ratio greater than a second transmission ratio of the second transmission unit.

19 Claims, 3 Drawing Sheets

DRIVE SYSTEM OF AN ELECTRIC VEHICLE

CROSS-REFERENCE TO RELATED APPLICATIONS

The present application claims priority to and benefits of Chinese Patent Application No. 201010291549.2 filed with State Intellectual Property Office of China on Sep. 26, 2010 and Chinese Patent Application No. 201110225534.0 filed with State Intellectual Property Office of China on August 5, the entirety of which is hereby incorporated by reference.

BACKGROUND

1. Technical Field

The present disclosure relates to a vehicle technology field, more particularly to a drive system of an electric vehicle.

2. Description of the Related Art

With increasing of fuel price and environmental pollution caused by traditional vehicles, electric vehicle has attracted most attention. An electric vehicle has a power source from a power battery, driven by an electric motor, thus breaking away from limitation of an engine and reducing the environmental pollution.

Traditionally, an electric vehicle may be driven by a drive motor and a reducer with a constant ratio. As widely known, the drive motor has a large output torsion and low efficiency at a low rotational speed. With the increasing of rotational speed of the drive motor, the efficiency is increasing as well, but an output torsion is much lower. With reference to the electric vehicle including a reducer with a constant ratio, for the reducer with a great torsion, the efficiency is increasing slowly with the increasing of the rotational speed of the drive motor, as a result power consumption of the vehicle is quite big at a high ground speed; for the reducer with a high rotational speed, the efficiency is increasing fast with the increasing of the rotational speed of the drive motor, however, due to the low transmission ratio of the reducer, the torsion transmitted to the vehicle wheels is too low to satisfy starting and climbing of the vehicle. As a result, the power consumption of the vehicle is quite big at a low ground speed. For example, an electric bus has a very frequent acceleration in parking and starting which may cause low efficiency of the drive motor. Therefore, the drive system of a traditional electric vehicle has difficulties to simultaneously meet the work conditions of a low ground speed and a high ground speed, and has a drive motor with a low efficiency, which may shorten the endurance mileage of an electric vehicle if power storage of a battery is not changed. As a result, the traditional electric vehicle is not able to meet complicated driving conditions.

SUMMARY

In order to solve at least one of the above problems, the present disclosure provides a drive system of an electric vehicle, which may reasonably match torsion and rotational speed characteristic of a drive motor to effectively improve the efficiencies of the drive motor in different driving conditions.

According to an aspect of the present disclosure, a drive system of an electric vehicle is provided. The drive system includes a drive motor, a transmission having an input shaft, a countershaft, an output shaft, a first transmission unit, a first clutch, a second transmission unit and a second clutch. The drive motor is attached to the input shaft; the input shaft is attached to the countershaft to provide power of the drive motor to the countershaft; the first transmission unit is placed between the countershaft and output shaft to transmit power between the countershaft and output shaft; the second transmission unit is placed between the countershaft and input shaft to transmit power between the countershaft and input shaft; the first clutch is attached to the countershaft and connected to the first transmission unit, for linking or cutting off the power transmission between the countershaft and the first transmission unit; the second clutch is attached to the countershaft and connected to the second transmission unit, for linking or cutting off the power transmission between the countershaft and the second transmission unit; a first transmission ratio of the first transmission unit is greater than a second transmission ratio of the second transmission unit.

The drive system of the electric vehicle further includes a hydraulic system connected to the first clutch to engage or disengage the first clutch, and connected to the second clutch to engage or disengage the second clutch.

In one embodiment of the present disclosure, with reference to the drive system of the electric vehicle, the transmission has a first transmission unit and a second transmission unit. The first transmission ratio of the first transmission unit is greater than the second transmission ratio of the second transmission unit. Therefore, the drive motor may transmit power to the vehicle wheels selectively by the first transmission unit or the second transmission unit. For example, at a low ground speed of the vehicle, the first transmission unit is selected to output a great torsion; and at a high ground speed of the vehicle, the second transmission unit is selected. Thus, selecting different transmission unit according to different driving conditions may reasonably match the torsion and rotational speed characteristic of the drive motor to effectively improve the efficiencies of the drive motor and improve the service efficiency of the power battery, so as to meet the complicated driving conditions.

Additionally, the drive system of the aforementioned embodiment of the present disclosure further includes the following technology features.

In one embodiment, the input shaft has a first gear and the countershaft has a second gear for engaging the first gear; via the first gear and the second gear, the input shaft is attached to the countershaft.

In one embodiment, the first transmission unit has a third gear attached to the countershaft and a fourth gear attached to the output shaft, for engaging the third gear.

In one embodiment, the third gear is rotatably attached around the countershaft and the fourth gear is fixed to the output shaft; a control section of the first clutch is fixed to the countershaft; a centre section of the first clutch is connected to the third gear.

In one embodiment, the second transmission unit comprises a fifth gear attached to the countershaft and a sixth gear attached to the output shaft, for engaging the fifth gear.

In one embodiment, the fifth gear is rotatably attached around the countershaft and the sixth gear is fixed to the output shaft; the control section of the second clutch is fixed to the countershaft; a centre section of the second clutch is connected to the fifth gear.

In one embodiment, the transmission further comprises a third transmission unit and a third clutch; the third transmission unit is placed between the countershaft and the output shaft to transmit power between the countershaft and the output shaft; the third clutch is attached to the countershaft and connected to the third transmission unit for linking or cutting off the power transmission between the countershaft and the third transmission unit; and the hydraulic system is connected with the third clutch to engage or disengage the third clutch; the third transmission has a third transmission ratio; the second transmission ratio is greater than the third transmission ratio.

In one embodiment, the third transmission unit comprises a seventh gear attached to the countershaft and a eighth gear for engaging the seventh gear.

In one embodiment, the seventh gear is rotatably attached around the countershaft, the eighth gear is fixed to the output shaft, the control section of the third clutch is fixed to the countershaft, and the centre section of the third clutch is connected with the seventh gear.

In one embodiment, the second clutch and the third clutch commonly have a control section.

In one embodiment, each of the first, second and third clutches is a wet clutch.

In one embodiment, the input shaft and the output shaft are all arranged on the same axial, and the axial of the countershaft is parallel with the input and output shafts.

According to another aspect of the present disclosure, the hydraulic system comprises:

an oil container;

a first clutch drive loop and a second clutch drive loop parallel to each other; the first clutch drive loop comprising a first hydraulic cylinder and a first proportional valve; wherein the first proportional valve is connected to the first hydraulic cylinder and the oil container respectively, and the piston of the first hydraulic cylinder is connected to the control section of the first clutch; the second clutch drive loop comprising a second hydraulic cylinder and a second proportional valve; wherein the second proportional valve is connected to the second hydraulic cylinder and the oil container respectively; and the piston of the second hydraulic cylinder is connected to the control section of the second clutch;

an inner pump driven by the countershaft, and an inlet of the inner pump connected to the oil container, an outlet of the inner pump connected to the first and second proportional valve; and a first check valve connected to the outlet of the inner pump in series;

an external pump driven by the external motor, the inlet of the external pump connected to the oil container and the outlet of the external pump connected to the first and second proportional valve respectively; and a second check valve connected to the outlet of the external pump in series, wherein, the serial connection of the first check valve and inner pump are connected with the serial connection of the second check valve and external pump in parallel between the first proportional valve and second proportional valve.

In one embodiment, the hydraulic system further comprises a third check valve connected to the inner pump in parallel.

In one embodiment, the hydraulic system further comprises a first filter and a second filter. The first filter is connected between the inlets of the inner pump and external pump and the oil container, and the second filter is connected between the first and second check valves and the first and second proportional valves.

In one embodiment, the hydraulic system further comprises a relief valve; the relief valve is parallel with the serial connection of the first check valve and inner pump, and the serial connection of the external pump and second check valve.

In one embodiment, the hydraulic system further comprises an accumulator connected between the first and second check valves and the first and second proportional valves.

In one embodiment, the first clutch drive loop further comprising a first buffer connected between the first proportional valve and first hydraulic cylinder; the second clutch drive loop comprising a second buffer connected between the second proportional valve and second hydraulic cylinder.

In one embodiment, the hydraulic cylinder further comprises a pressure regulating valve and a fourth check valve; the pressure regulating valve and the inner pump are connected in parallel to provide lubricating oil to the drive system; the fourth check valve is connected between the outlets of the pressure regulating valve and inner pump.

Further advantages and particulars of the present disclosure will become apparent from the following description and the illustrations, in which is represented an embodiment form of the subject of the disclosure in a purely exemplary manner.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION

Figure 1:
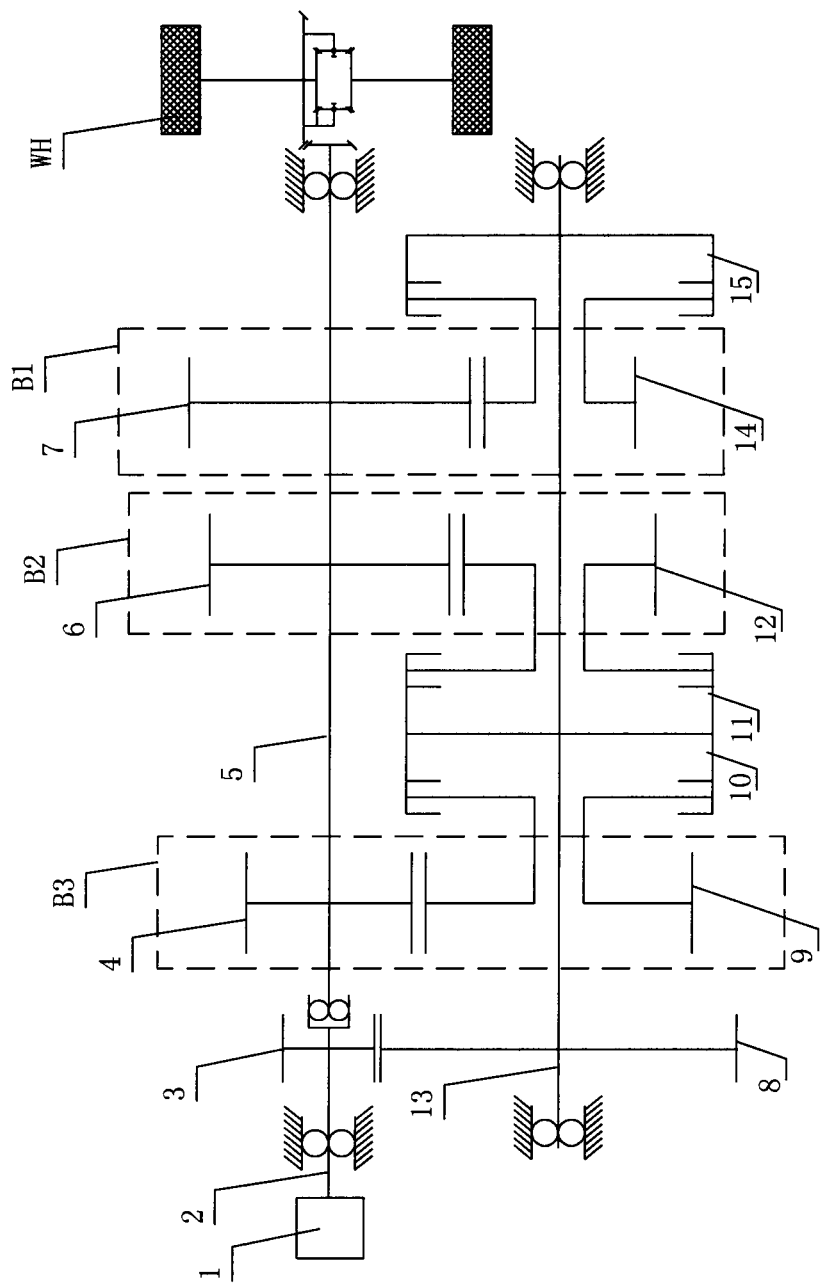
FIG. 1 is a schematic diagram illustrating a drive system of an electric vehicle according to an embodiment of the present disclosure.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

In the description of the present disclosure, it needs to understand, the words "center", "vertical", "transverse", "upper", "down", "front", "rear", "left", "right", "vertical", "horizontal", "top", "bottom", "inner", and "external" etc, should be construed to refer to the orientations as then described or shown in drawings under discussion. These relative terms are for convenience of description and do not require that the present disclosure be constructed or operated in a particular orientation.

The drive system of the electric vehicle according to embodiments of the present disclosure will become apparent from the following description based on figures.

Figure 2:
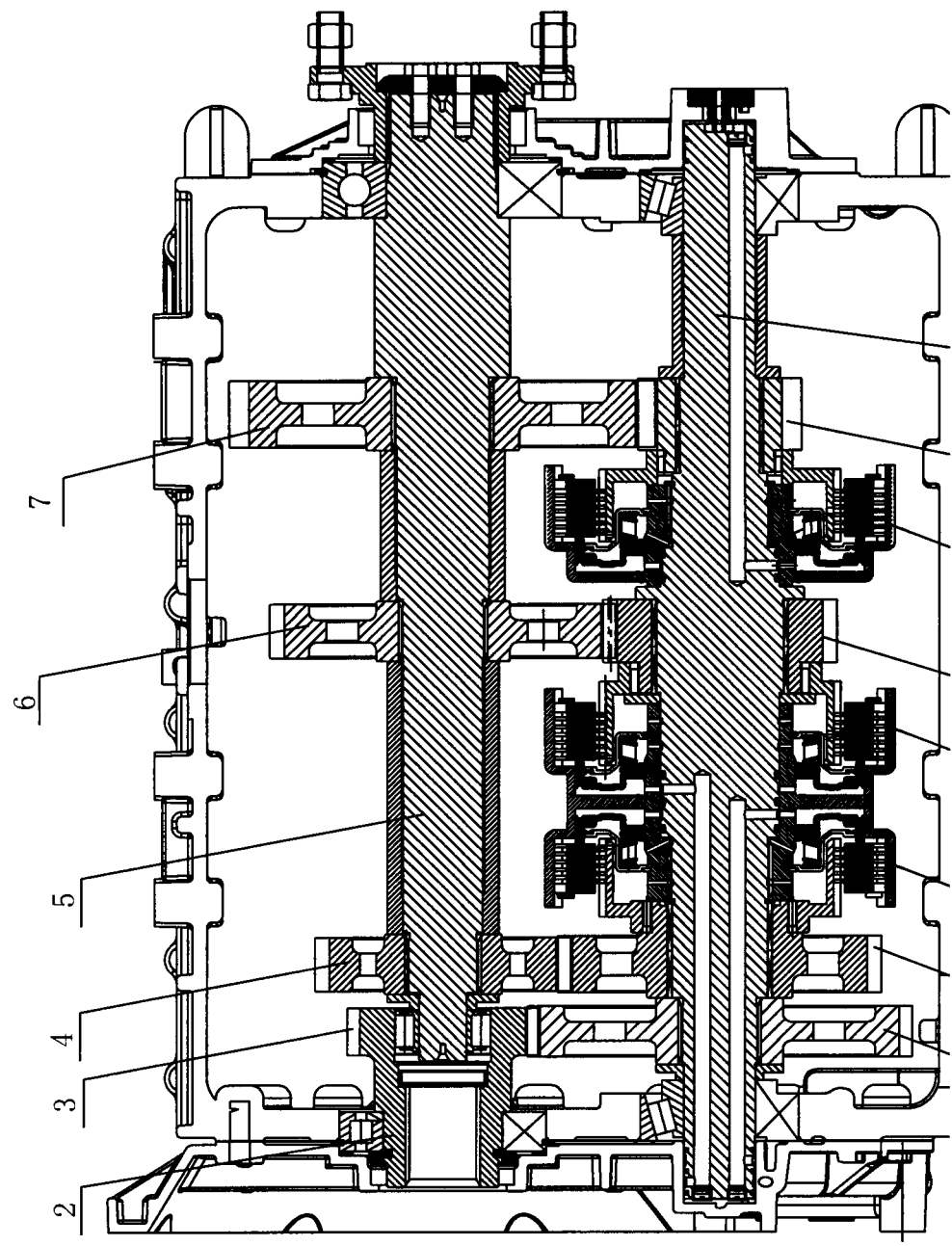
FIG. 2 is a schematic diagram illustrating a transmission of the drive system in FIG. 1.
Figure 3:
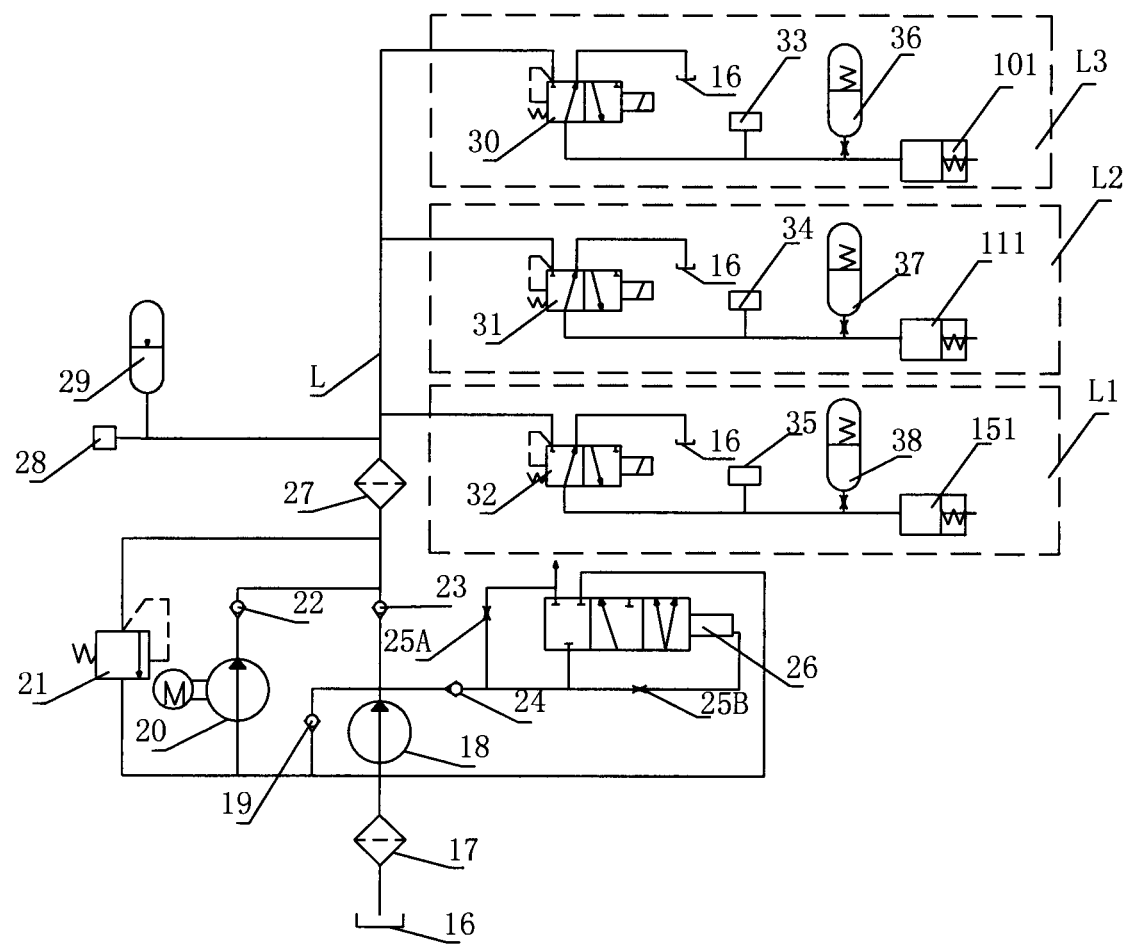
FIG. 3 is a schematic diagram illustrating a hydraulic system of the drive system in FIG. 1.

As shown in FIG. 1 to FIG. 3, the drive system of the electric vehicle comprises a drive motor 1, a transmission and a hydraulic system.

Particularly, the transmission has an input shaft 2, a countershaft 13, an output shaft 5, a first transmission unit B1, a first clutch 15, a second transmission unit B2 and a second clutch 11. In which, the drive motor 1 is attached to the input shaft 2 to drive the rotation of the input shaft 2. In one embodiment, the drive motor 1 is attached to the input shaft 2 via a spline. However, the present disclosure is not limited to the spline. As shown in FIG. 2, the drive motor 1 may be attached to the input shaft 2 by other methods. The direct attaching between the drive motor 1 and the input shaft 2 differs from the traditional vehicle with an engine. The difference is that there are no clutches and torque converters between the drive motor 1 and the input shaft 2 in the present disclosure, which may improve the power transmission efficiency and simplify the structure.

The input shaft 2 is attached to the countershaft 13 to provide power of the drive motor 1 to the countershaft 13. In one embodiment, via a gear pair, the input shaft 2 is attached to the countershaft 13. In which, the gear pair includes a first gear 3 and a second gear 8; and the first gear 3 is attached to the input shaft 2, the second gear 8 is attached to the countershaft 13. The first gear 3 and second gear 8 may engage to each other.

The first transmission unit B1 is placed between the countershaft 13 and output shaft 5 to transmit power between the countershaft 13 and output shaft 5. The second transmission unit B2 is placed between the countershaft 13 and input shaft 5 to transmit power between the countershaft 13 and input shaft 5.

The first clutch 15 is attached to the countershaft 13 and connected to the first transmission unit B1, for linking or cutting off the power transmission between the countershaft 13 and the first transmission unit B1. In other words, the first clutch 15 may be configured for linking or cutting off the power transmission between the countershaft 13 and the output shaft 5.

The second clutch 11 is attached to the countershaft 13 and connected to the second transmission unit B2, for linking or cutting off the power transmission between the countershaft 13 and the second transmission unit B2. In other words, the second clutch 11 may be configured for linking or cutting off the power transmission between the countershaft 13 and the output shaft 5. The first transmission unit B1 has a first transmission ratio, the second transmission unit has a second transmission ratio. The first transmission ratio is greater than the second transmission ratio.

The hydraulic system is connected to the first clutch 15 to engage or disengage the first clutch 15, and connected to the second clutch 11 to engage or disengage the second clutch 11.

According to the drive system of the electric vehicle of the present disclosure, the transmission has the first transmission unit and the second transmission unit; the first transmission ratio of the first transmission unit is greater than the second transmission ratio of the second transmission unit, which may reasonably match the torsion and rotational speed characteristic of the drive motor to effectively improve the efficiencies of the drive motor in different driving conditions, thus realizing the energy saving and improving the endurance mileage of vehicles. Also the structure of the drive system is not complicated. More particularly, when the electric vehicle is running at a low speed, such as starting, climbing or accelerating, the output torsion should be big, and the hydraulic system may connect to the first clutch 15; in other words, when the vehicle is switched to the first forward gear position, the power of the drive motor 1 is transmitted to the input shaft 2; then the power is transmitted from the input shaft 2 to the countershaft 13 via the first gear 3 and the second gear 8; then the power is transmitted from the countershaft 13 to the output shaft 15 via the first clutch 15 and the first transmission unit B1, at last, to the wheels. Due to the first transmission unit having a greater transmission ratio, the torsion transmitted to the wheels meets the requirement of greater output torsion. When the speed of the vehicle is increasing, the output torsion is no need to be big, and the hydraulic system may disengage the first clutch 15 and engage the second clutch 11. In other words, when the vehicle is switched to the second forward gear position, the power is transmitted from the countershaft 13 to the output shaft 5 via the second clutch 11 and the second transmission unit B2. Due to the second transmission unit B2 having a low transmission ratio, the torsion transmitted to the wheels is decreasing and the rotational speed of the wheels is increasing, to meet the requirement of low output torsion and high output rotational speed.

When the vehicle needs to reverse, the drive motor 1 may reversely rotate, and the hydraulic system may disengage the second clutch 11 and engage the first clutch 15. In other words, when the vehicle is switched to the rear gear position, the power is transmitted to the wheels via the first clutch 15 and the first transmission unit B1. Due to the output torsion for the reverse of the vehicle, it is better to engage the first clutch 15 to transmit power via the first transmission unit B1 that has a greater transmission ratio.

From mentioned above, selecting suitable transmission units may reasonably match the torsion and rotational speed characteristic of the drive motor 1 to effectively improve the efficiencies of the drive motor in different driving conditions, thus realizing the energy saving and improving the endurance mileage of vehicles. Thereby, the electric vehicle may have similar features to the traditional vehicle with an engine.

According to the aforementioned description, the drive system of the electric vehicle has the first transmission unit B1 and the second transmission unit B2. The vehicle has two forward gear positions and a rear gear position. The present disclosure should not be limited to that. In some embodiments, the drive system may have any suitable number of transmissions, such as three or four transmissions.

As shown in FIG. 1 to FIG. 3, with reference to one embodiment, the transmission further comprises a third transmission unit B3 and a third clutch 10. The third transmission unit B3 is placed between the countershaft 13 and the output shaft 5 to transmit power between the countershaft 13 and the output shaft 5. The third clutch 10 is attached to the countershaft 13 and connected to third transmission unit B3 to link or cut off the power transmission between the countershaft 13 and the third transmission unit B3. In other words, the third clutch 10 is configured for linking or cutting off the power transmission between the countershaft 13 and the output shaft 5. The hydraulic system is connected to the third clutch 10 to engage or disengage the third clutch 10. The third transmission unit B3 has a third transmission ratio. In which, the second transmission ratio is greater than the third transmission ratio.

Such as, when the speed of the vehicle is further increasing, the hydraulic system disengages the first clutch 15 and second clutch 11, and engages the third clutch 10. In other words, the vehicle is switched to the third forward gear position. The power may be transmitted from the countershaft 13 to the output shaft 5 via the third transmission unit B3. Due to the third transmission unit B3 having a less transmission ratio comparing with the second transmission unit B2 and first transmission unit B1 and the output torsion is low, but the rotational speed is high. Thereby, when the speed of the vehicle is further increasing, the power may be transmitted via the third clutch 10 and the third transmission unit B3, further improving the efficiency of the drive motor 1 and reducing the energy consumption.

In some embodiments, the first clutch 15, the second clutch 11 and the third clutch 10 each may be a wet clutch. As shown in FIG. 1 and FIG. 2, the input shaft 2 and the output shaft 5 are all arranged on the same axial, and the axial of the countershaft 13 is parallel with the input shaft 2 and the output shaft 5, which may reduce the size of the transmission and the transmission has a compact structure, to save the setup space.

As shown in FIG. 1 and FIG. 2, the second clutch 11 and the third clutch 10 commonly have a control section. Thus, the size of the transmission is further reduced, simplifying the structure of the transmission and reducing the manufacturing cost. In FIG. 1 and FIG. 2, the first clutch 15 and the first transmission unit B1 are closest to the wheels; the third clutch 10 and the third transmission unit B3 are fastest for the wheels; the second clutch 11 and the second transmission unit B2 are placed between the first clutch 15 and the third clutch 10. However, should be understood by a person skilled in the art that the clutches and transmissions may arranged according to a specific application.

As shown in FIG. 1 and FIG. 2, in some embodiments, the first transmission unit B1 comprises a third gear 14 attached to the countershaft 13 and a fourth gear 7 attached to the output shaft 5 for engaging the third gear 14. The third gear 14 and the fourth gear 7 may be cylindrical gears. Therefore, the structure of the first transmission unit B1 is not complicated. The third gear 14 may be rotatably attached around the output shaft 5 and the fourth gear 7 is fixed to the output shaft 5. The control section of the first clutch 15 is fixed to the countershaft 13 and the centre section of the first clutch 15 is connected to the third gear 14.

The second transmission unit B2 comprises a fifth gear 12 attached to the countershaft 13 and a sixth gear 6 for engaging the fifth gear 12. The fifth gear 12 may be rotatably attached around the countershaft 13 and the sixth gear 6 is fixed to the output shaft 5. The control section of the second clutch 11 is fixed to the countershaft 13 and the centre section of the second clutch 11 is connected to the fifth gear 12.

The third transmission unit B3 comprises a seventh gear 9 attached to the countershaft 13 and an eighth gear 4 for engaging the seventh gear 9. The seventh gear 9 may rotatably attached around the countershaft 13 and the eighth gear 4 is fixed to the output shaft 5. The control section of the third clutch 10 is fixed to the countershaft 13 and the centre section of the third clutch 10 is connected to the seventh gear 9.

Further description of the hydraulic system of the drive system of the electric vehicle will become apparent hereinafter with reference to FIG. 3.

As shown in FIG. 3, the hydraulic system comprises an oil container 16, a first clutch drive loop L1 for driving the first clutch 15, a second clutch drive loop L2 for driving the second clutch 11 and a third clutch drive loop L3 for driving the third clutch 10, an inner pump 18, a first check valve 23 connected to the outlet of the inner pump 18 in series, an external pump 20, a second check valve 22 connected to the outlet of the external pump 20.

When the transmission only has the first transmission unit B1 and the second transmission unit B2, there is no need to have the third clutch drive loop L3. When the transmission has multiple transmission units, corresponding clutch drive loops may be added.

As shown in FIG. 3, the first clutch drive loop L1, the second clutch drive loop L2 and the third clutch drive loop L3 are parallel to each other.

The first clutch drive loop L1 comprises a first hydraulic cylinder 151 and a first proportional valve 32. For example, the first proportional valve 32 may be a two-position three-way solenoid valve. In some embodiments, the first clutch drive loop L1 may further comprise a first buffer 38 placed between the first proportional valve 32 and first hydraulic cylinder 151. A first oil pressure sensor 35 may be placed between the first buffer 38 and the first proportional valve 32 to measure the oil pressure in the first clutch drive loop L1.

Similarly, the second clutch drive loop L2 may comprise a second hydraulic cylinder 111 and a second proportional valve 31. In some embodiments, the second clutch drive loop L2 further comprises a second buffer 37 placed between the second proportional valve 31 and the second hydraulic cylinder 111. A second oil pressure sensor 34 may be placed between the second buffer 37 and the second proportional valve 31.

The third clutch drive loop L3 may comprise a third hydraulic cylinder 101 and a third proportional valve 30. In some embodiments, the third clutch drive loop L3 further comprises a third buffer 36 placed between the third proportional valve 30 and the third hydraulic cylinder 101. A third oil pressure sensor 33 may be placed between the third buffer 36 and the third proportional valve 30.

As shown in FIG. 3, the first proportional valve 32 is connected to the first hydraulic cylinder 151 and the oil container 16 respectively. The second proportional valve 31 is connected to the second hydraulic cylinder 111 and the oil container 16 respectively. The third proportional valve 30 is connected to the third hydraulic cylinder 101 and the oil container 16. The piston of the first hydraulic cylinder 151 is connected to the control section of the first clutch 15 to engage or disengage the first clutch 15. The piston of the second hydraulic cylinder 111 is connected to the control section of the second clutch 11 to engage or disengage the second clutch 11. The piston of the third hydraulic cylinder 101 is connected to the control section of the third clutch 10 to engage or disengage the third clutch 10.

The inner pump 18 may be driven by the countershaft 13 and the external pump 20 may be driven by the external motor M. The inlets of the inner pump 18 and the external pump 20 may be connected to the oil container 16. A first filter 17 is placed between the inlets of the inner pump 18 and external pump 20 and the oil container 16. The outlets of the inner pump 18 and the external pump 20 may be respectively connected to the first proportion valve 32, the second proportion valve 31 and the third proportion valve 30. A second filter 27 is placed between the outlets of the inner pump 18 and external pump 20 and the first proportion valve 32, the second proportion valve 31 and the third proportion valve 30. The filtration accuracy of the second filter 27 is higher than the filtration accuracy of the first filter 17, thereby, further improving the cleanness of the hydraulic oil into the first, second and third proportional valves 32, 31, 30.

The inner pump 18 is parallel to the external pump 20. And the first check valve 23 is connected to the outlet of the inner pump 18 in series. The second check valve 22 is connected to the outlet of the external pump 20 in series. And the serial connection of the first check valve 23 and inner pump 18 and the serial connection of the second check valve 22 and external pump 20 are parallel between the oil container 16 and the first, second and third proportional valves 32, 31, 30.

In some embodiments, the hydraulic system further comprises an accumulator 29 connected between the first check valve 23 and second check valve 22 and the first, second and third proportional valves 32, 31, 30 and an oil pressure sensor 28 for measuring the oil pressure in the main hypertension line L of the hydraulic system.

The hydraulic system further comprises a relief valve 21; the relief valve 21 is parallel with the serial connection of the first check valve 23 and inner pump 18, and the serial connection of the external pump 20 and second check valve 22 to relieve the hydraulic oil in the main hypertension line L to the oil container 16. In some embodiments, the hydraulic system further comprises a pressure regulating valve 26. The pressure regulating valve 26 is parallel with the inner pump 18 to provide lubricating oil to the drive system such as each of gear pairs in the transmission, bearings etc. A fourth check valve 24 is placed between the outlets of the pressure regulating valve 26 and the inner pump 18, configured for reversely adsorbing to the pressure regulating valve 26 during the inner pump 18 reversely rotates. Two damping elements 25A and 25B are connected to the pressure regulating valve 26 in serial. After the vehicle is starting, the oil quantity may increase from the inner pump 18. Since the hydraulic oil passes through the damping elements 25A and 25B and the sight leakage of the pressure regulating valve 26 is supplied, the oil pressure in the main hypertension line L may increase quickly.

In another embodiment of the present disclosure, a third check valve 19 is parallel with the inner pump 18, configured for preventing vacuum adsorption during reverse absorption of the inner pump 18.

Further description of the operation of the hydraulic system of the drive system of the present disclosure will become apparent hereinafter.

As shown in FIG. 2, after the hydraulic system starts, the inner pump 18 and/or the external pump 20 may absorb oil from the oil container 16 via the filter 17. The hydraulic oil may flow into the main hypertension line L, then into one of the first clutch drive loop L1, the second clutch drive loop L2 and the third clutch drive loop L3, that means, one of the first hydraulic cylinder 151, the second hydraulic cylinder 111 and the third hydraulic cylinder 101.

For convenience, the first hydraulic cylinder 151 is described as an example, however, one should understand that the second clutch drive loop L2 and the third clutch drive loop L3 may operate similarly. The piston of the first hydraulic cylinder 151 may compress the return spring under the hydraulic oil pressure, to push the control section and centre section of the first clutch 15 to partly engage, so that the power may be transmitted from the countershaft 13 to the output shaft 5 via the first clutch 15 (that is, the third gear 14 and fourth gear 7), at last, to the wheels. When the first clutch 15 is disengaged, the hydraulic oil may be in communication with the oil container 16, and the oil pressure in the first hydraulic cylinder 151 may be decreasing quickly and the piston of the first hydraulic cylinder 15 may move quickly under the push of the return spring. Thus, the hydraulic oil may flow into the oil container 16. The disengaging of the control section and centre section of the first clutch 15 may cut off the power transmission between the countershaft 13 and the output shaft 5.

With reference to the drive system of the present disclosure, the inner pump 18 is generally adopted to supply oil. The inner pump 18 may be driven by the countershaft 13. The first check valve 23 only allows the hydraulic oil flowing from the inner pump 18 into the first, second and third clutch drive loops L1, L2 and L3, to prevent the oil pressure in the drive system from impacting the operation of the inner pump 18 and prevent from reverse flow of the hydraulic oil in the drive system.

In some embodiments, the third check valve 19 only allows the hydraulic oil flowing from oil container 16 into the outlet of the inner pump 18, to prevent from vacuum absorption during the reverse absorption of the inner pump 18. For example, when the vehicle is reverse, the inner pump 18 may reversely rotate and then the outlet of the inner pump 18 may absorb oil from the oil container 16 via the third check valve 19, to avoid damage of the inner pump 18. In other words, an oil flow circuit are formed from the oil container 16, the first relief valve 17, the third check valve 19 and the inner pump 18 to avoid the vacuum absorption of the inner pump 18.

The fourth check valve 24 only allows the hydraulic oil flowing from the inner pump 18 into the pressure regulating valve 26, to prevent from the reverse flowing of the hydraulic oil.

In some embodiments, if the oil pressure in the inner pump 18 is too low, the external motor M is started to drive the external pump 20 that is used to supply oil pressure to the main hypertension line L of the hydraulic system. The second check valve 22 only allows the hydraulic oil flowing from the external pump 20 to the first, second and third clutch drive loops L1, L2 and L3, to prevent the oil pressure in the system from impacting the operation of the external pump 20 and prevent from the reverse flowing of the hydraulic oil in the system.

The inner pump 18 may provide hydraulic oil when the hydraulic system lacks oil quantity, the remaining oil in the inner pump 18 may function as the lubricating oil or flow into the oil container 16. By using an accumulator 29, the external pump 20 may work interstitially, as mentioned above, and the relief valve 21 works as a relief effect.

In the aforementioned hydraulic system, the pressure regulating valve 26 provides the lubricating oil to the lubricating system of the vehicles.

In some embodiments, the hydraulic oil may be provided by the external pump 20 driven by the external motor M and the inner pump 18 driven by the countershaft 13. By setting the external pump 20, before the start of the electric vehicle, the external pump 20 may provide oil to the first clutch 15 to engage the first clutch 15, thereby, realizing the zero rotational starting and no idle condition, and reducing the energy consumption of the electric vehicle, improving the utilization rate of the electric power.

When the vehicle is running, the excessive energy may be stored into the accumulator 29. The stored energy may be utilized to perform the gear shift operation to improve the efficiency of the transmission.

For the drive system of the electric vehicle of the present disclosure, the first clutch 15, the second clutch 11 and the third clutch 10 are all controlled by the hydraulic system, and the first clutch 15 may be engaged before the starting of the vehicle, thereby, the idle condition of the drive motor 1 does not exist after starting the vehicles. Only if the drive motor 1 starts to run, the power may be transmitted to the transmission, realizing the startup of zero rotational speed. As a result, the electric power loss may be reduced and utilization rate of the electric power may be improved. When the hydraulic oil provided by the inner pump 18 is not enough, the external pump 20 may be used for supplementation, improving the performance of the electric vehicles.

Therefore, the drive system of the present disclosure can realize the startup of zero rotational speed. According to the pedaling degree and the velocity change, the position may be automatically switched, which may reasonably match the torsion and rotational speed characteristic of the drive motor to effectively improve the efficiencies of the drive motor in different driving conditions. The efficiencies of the drive motor may reach optimization in different driving conditions to save energy consumption and increase the endurance mileage of the electric vehicle. For example, the drive system is much suitable for electric bus, which may need frequent acceleration, deceleration, parking and startup.

Further description of the drive system of the present disclosure will become apparent with reference to FIG. 1, just like the transmission of the drive system, the transmission of the drive system of the present disclosure may comprise two or three and over transmission units.

First, with reference to the parking structure of the drive system of the present disclosure in FIG. 1, when the electric vehicle is in a parking state, the control section of the first clutch 15 is disengaged with the centre section; the control section of the second clutch 10 is disengaged with the centre section; the control section of the third clutch 10 is disengaged with the centre section; the three clutches are all disengaged and the power transmission from the drive motor 1 to the output shaft 5 is cut off.

Then, with reference to the first forward gear of the drive system of the present disclosure in FIG. 1, when the electric vehicle is in a starting state or driving at a low speed, a shifting control system may disengage the second clutch 11 and the third clutch 10 via a shifting mechanism, engage the control section and centre section of the first clutch 15. The power transmission line of the first forward gear is: the drive motor 1→the input shaft 2→the first gear 3→the second gear 8→the countershaft 13→the first clutch 15→the third clutch 14→the fourth gear 7→the output shaft 5. At the moment, the rotational speed of the drive motor 1 is lower, the output torsion is greatest, the transmission ratio is greatest and the power transmitted to the wheels is greatest. The shifting control system and the shifting mechanism are widely known and do not require detailed description.

Then, with reference to the second forward gear of the drive system of the present disclosure, when the electric vehicle is driving at a moderate speed, the shifting control system may disengage the first clutch 15 and the third clutch 10 via the shifting mechanism, engage the control section and centre section of the second clutch 11. For example, when shifting the first forward gear to the second forward gear, the shifting control system may induct the current driving state of the electric vehicle via corresponding sensors, to judge the driving gears of the electric vehicle. The first clutch 15 disengages at the same time, the second clutch 11 engages, to reach the aim of shifting gears. The power transmission line of the second forward gear is: the drive motor 1→the input shaft first gear 3→the second gear the countershaft 13→the second clutch 11→the fifth gear 12→the sixth gear 6→the output gear 5. At the moment, since the transmission ratio is greater and the efficiency of the drive motor 1 is lower, comparing with the first forward gear, the transmission ratio of the second forward gear is lower, the efficiency of the drive motor 2 is larger, as well as the energy utilization ratio is larger.

Then, with reference to the third forward gear of the drive system of the present disclosure, when the electric vehicle is driving at a high speed, the shifting control system may disengage the first clutch 15 and the second clutch 11 via the shifting mechanism, engage the control section and centre section of the third clutch 10. For example, when shifting the second forward gear to the third forward gear, similarly with shifting the first forward gear to the second forward gear, the second clutch 11 disengages at the same time the third clutch 10 engages. The power transmission line of the third forward gear is: the drive motor 1→the input shaft 2→the first gear 3→the second gear 8→the countershaft 13→the third clutch 10→the seventh gear 9→the eighth gear 4→the output shaft 5. At the moment, since the transmission ratio is greater and the efficiency of the drive motor is lower, comparing with the first forward gear and the second forward gear, the transmission ratio of the third forward gear is lowest, as well as the energy utilization ratio is largest.

Finally, with reference to the reverse gear of the drive system of the present disclosure, when the electric vehicle is driving in reverse gear, the shifting control system may disengage the second clutch 11 and the third clutch 10 via the shifting mechanism, engage the control section and the centre section of the first clutch 15. The drive motor 1 may reversely rotate in reverse gear of the electric vehicle. The power transmission line of the reverse gear is: the drive motor 1→the input shaft 2→the first gear 3→the second gear 8→the countershaft first clutch 15→the third gear 14→the fourth gear 7→the output gear 5.

According to embodiments of the present disclosure, the drive system of the electric vehicle comprises at least two transmission units, which may meet various complicated work conditions for vehicle driving and may be more energy saving, and have simply structure.

In aforementioned embodiments, the transmission may provide three forward gears and a reverse gear, which may not only meet requirement of large output torsion when the vehicle is starting and climbing, but also meet requirement of maximum output speed when the vehicle is driving on a smooth road. The output torsion needs to be quite large when the vehicle is starting, climbing and accelerating. The gear of the transmission may be shifted to a low speed gear, that is, the first forward gear or the second forward gear. Due to the transmission ratio in the low speed gear is quite large, the torsion transmitted to the wheels is quite large. When the electric vehicle is driving at a high speed on the smooth road, the gear of the transmission may be shifted to a high speed gear, that is, the third forward gear. At that moment, the transmission ratio of the transmission is quite low thus the torsion transmitted to the wheels is low, but the rotational speed of the wheels may be improved to a maximum valve. Meanwhile, by the shifting control system, the electric vehicle may reasonably control the gears shifting, reasonably match the torsion and rotational speed characteristic of the drive motor, optimize the efficiencies of the drive motor in different driving conditions, as a result, reach the energy saving and increase the endurance mileage of the electric vehicles.

According to embodiments of the present disclosure, the three forward gears of the transmission may be mutually independent and the gear shifting may be realized by controlling the disengaging or engaging of the control section and centre section of each clutch. Meanwhile, any person skilled in the art may reasonably control via the shifting control system to avoid the power interrupt during shifting gear process. Therefore, the explicit sense of decreasing speed may be not apparent during shifting gear process. Comparing with the traditional automotive transmission, the structure of the transmission of the present disclosure is much simple.

According to embodiments of the present disclosure, the external pump of the drive system may drive the first clutch to realize the first forward gear, then control the starting of the drive motor 1 to realize the zero startup of vehicles.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A drive system of an electric vehicle comprising:
   a drive motor;
   a transmission having an input shaft, a countershaft, an output shaft, a first transmission unit, a first clutch, a second transmission unit and a second clutch;
   wherein, the drive motor is attached to the input shaft; the input shaft is attached to the countershaft to provide power of the drive motor to the countershaft; the first transmission unit is placed between the countershaft and output shaft to transmit power between the countershaft and the output shaft; the second transmission unit is placed between the countershaft and the input shaft to transmit power between the countershaft and the input shaft; the first clutch is attached to the countershaft and connected to the first transmission unit, for linking or cutting off the power transmission between the countershaft and the first transmission unit; the second clutch is attached to the countershaft and connected to the second transmission unit, for linking or cutting off the power transmission between the countershaft and the second transmission unit; a first transmission ratio of the first transmission unit is greater than a second transmission ratio of the second transmission unit; and a hydraulic system connected to the first clutch to engage or disengage the first clutch, and connected to the second clutch to engage or disengage the second clutch.

2. The drive system of the claim 1, wherein the input shaft has a first gear and the countershaft has a second gear for engaging the first gear, and the input shaft is attached to the countershaft via the first gear and the second gear.

3. The drive system of the claim 1, wherein the first transmission unit has a third gear attached to the countershaft and a fourth gear attached to the output shaft, for engaging the third gear.

4. The drive system of the claim 3, wherein: the third gear is rotatably attached around the countershaft and the fourth gear is fixed to the output shaft; a control section of the first clutch is fixed to the countershaft; and a centre section of the first clutch is connected to the third gear.

5. The drive system of claim 1, wherein the second transmission unit comprises a fifth gear attached to the countershaft and a sixth gear attached to the output shaft, for engaging the fifth gear.

6. The drive system of claim 5, wherein: the fifth gear is rotatably attached around the countershaft and the sixth gear is fixed to the output shaft; the control section of the second clutch is fixed to the countershaft; and a centre section of the second clutch is connected to the fifth gear.

7. The drive system of claim 5, wherein: the transmission further comprises a third transmission unit and a third clutch; the third transmission unit is placed between the countershaft and the output shaft to transmit power between the countershaft and the output shaft; the third clutch is attached to the countershaft and connected to the third transmission unit for linking or cutting off the power transmission between the countershaft and the third transmission unit; and the hydraulic system is connected with the third clutch to engage or disengage the third clutch; and the third transmission has a third transmission ratio, and the second transmission ratio is greater than the third transmission ratio.

8. The drive system of claim 7, wherein the third transmission unit comprises a seventh gear attached to the countershaft and a eighth gear for engaging the seventh gear.

9. The drive system of claim 8, wherein the seventh gear is rotatably attached around the countershaft, the eighth gear is fixed to the output shaft, the control section of the third clutch is fixed to the countershaft, and the centre section of the third clutch is connected with the seventh gear.

10. The drive system of claim 7, wherein the second clutch and the third clutch have a common control section.

11. The drive system of claim 7, wherein each of the first, second, and third clutch is a wet clutch.

12. The drive system of claim 1, wherein the input shaft and the output shaft are arranged on the same axial, and the axial of the countershaft is parallel with the input and output shafts.

13. The drive system of claim 1, wherein the hydraulic system comprises:

an oil container;

a first clutch drive loop and a second clutch drive loop parallel to each other; the first clutch drive loop comprising a first hydraulic cylinder and a first proportional valve; wherein the first proportional valve is connected to the first hydraulic cylinder and the oil container respectively, and a piston of the first hydraulic cylinder is connected to the control section of the first clutch; the second clutch drive loop comprising a second hydraulic cylinder and second proportional valve; wherein the second proportional valve is connected to the second hydraulic cylinder and the oil container respectively, and a piston of the second hydraulic cylinder is connected to the control section of the second clutch;

an inner pump driven by the countershaft, and an inlet of the inner pump connected to the oil container, an outlet of the inner pump connected to the first and second proportional valve; and a first check valve connected to the outlet of the inner pump in series;

an external pump driven by the external motor, the inlet of the external pump connected to the oil container and the outlet of the external pump connected to the first and second proportional valve respectively; and a second check valve connected to the outlet of the external pump in series;

wherein, the serially connected first check valve and inner pump are connected with the serially connected second check valve and external pump in parallel between the first proportional valve and second proportional valve.

14. The drive system of the claim 13, wherein the hydraulic system further comprises a third check valve connected to the inner pump in parallel.

15. The drive system of claim 14, wherein the hydraulic system further comprises a first relief valve and a second relief valve, wherein the first relief valve is connected between the inlets of the inner pump and external pump and the oil container, and the second relief valve is connected between the first and second check valves and the first and second proportional valves.

16. The drive system of claim 14, wherein the hydraulic system further comprising a relief valve; wherein the relief valve is parallel with the serially connected first check valve and inner pump, and the serially connected external pump and second check valve.

17. The drive system of claim 13, wherein the hydraulic system further comprises a accumulator connected between the first and second check valves and the first and second proportional valves.

18. The drive system of claim 17, wherein the first clutch drive loop further comprises a first buffer placed between the first proportional valve and first hydraulic cylinder; and wherein the second clutch drive loop comprises a second buffer placed between the second proportional valve and second hydraulic cylinder.

19. The drive system of claim 13, wherein the hydraulic cylinder further comprises a pressure regulating valve and a fourth check valve; wherein the pressure regulating valve and the inner pump are connected in parallel to provide lubricating oil to the drive system, and the fourth check valve is connected between the outlets of the pressure regulating valve and inner pump.

* * * * *